US011031755B2

(12) United States Patent
Ahmad et al.

(10) Patent No.: US 11,031,755 B2
(45) Date of Patent: Jun. 8, 2021

(54) AUTOMATED SHOTGUN STICK FOR CLAMPING GROUNDING DEVICES ON OVERHEAD LINES

(71) Applicant: Honeywell International Inc., Morris Plains, NJ (US)

(72) Inventors: Rizwan Ahmad, Telangana (IN); Ataur Rahman, Andhra Pradesh (IN); Justin Matthew Wilson, Summerville, SC (US); Alfred Flojo, Chicago, IL (US); Linda Ziegler-Robinson, Goose Creek, SC (US)

(73) Assignee: Honeywell International Inc., Morris Plains, NJ (US)

( * ) Notice: Subject to any disclaimer, the term of this patent is extended or adjusted under 35 U.S.C. 154(b) by 256 days.

(21) Appl. No.: 16/146,315

(22) Filed: Sep. 28, 2018

(65) Prior Publication Data

US 2019/0097400 A1  Mar. 28, 2019

Related U.S. Application Data

(60) Provisional application No. 62/564,728, filed on Sep. 28, 2017.

(51) Int. Cl.
*H02G 1/02* (2006.01)
*B25B 28/00* (2006.01)

(52) U.S. Cl.
CPC ............. *H02G 1/02* (2013.01); *B25B 28/00* (2013.01)

(58) Field of Classification Search
CPC .......... H02G 1/02; H02G 7/053; B25B 28/00; B25B 9/00; H01H 85/0208; H01R 4/52; H01R 4/66; H01R 4/38; H01R 43/0428; H01R 43/00
See application file for complete search history.

(56) References Cited

U.S. PATENT DOCUMENTS

| 4,242,930 A * | 1/1981 | Myers et al. ......... B25B 23/142 |
| | | 81/474 |
| 6,744,255 B1 | 6/2004 | Steinbrecher et al. |
| 8,943,926 B2 | 2/2015 | Davis |
| 9,768,576 B2 * | 9/2017 | Sook ...................... H01R 11/14 |
| 10,122,101 B2 * | 11/2018 | Rahman ................... H02P 8/12 |
| 2015/0270674 A1 | 9/2015 | Sook et al. |
| 2016/0325424 A1 | 11/2016 | Bevins et al. |

* cited by examiner

*Primary Examiner* — David B. Thomas
(74) *Attorney, Agent, or Firm* — Alston & Bird LLP

(57) ABSTRACT

A shotgun stick for use with grounding devices is provided. An example shotgun stick includes a housing and a drive shaft supported within the housing. The shotgun stick further includes a torque connector coupled with a first end of the drive shaft that receives a grounding clamp assembly. The shotgun stick includes a motor assembly operably connected to a second end of the drive shaft. In an automatic mode, the motor assembly drives the drive shaft so as to actuate the grounding clamp assembly received by the torque connector. The shotgun stick also includes a manual locking mechanism. In a manual mode, the manual locking assembly locks the drive shaft to at least a portion of the housing so as to preclude rotation of the drive shaft and allow manual actuation of the grounding clamp assembly received by the torque connector.

20 Claims, 10 Drawing Sheets

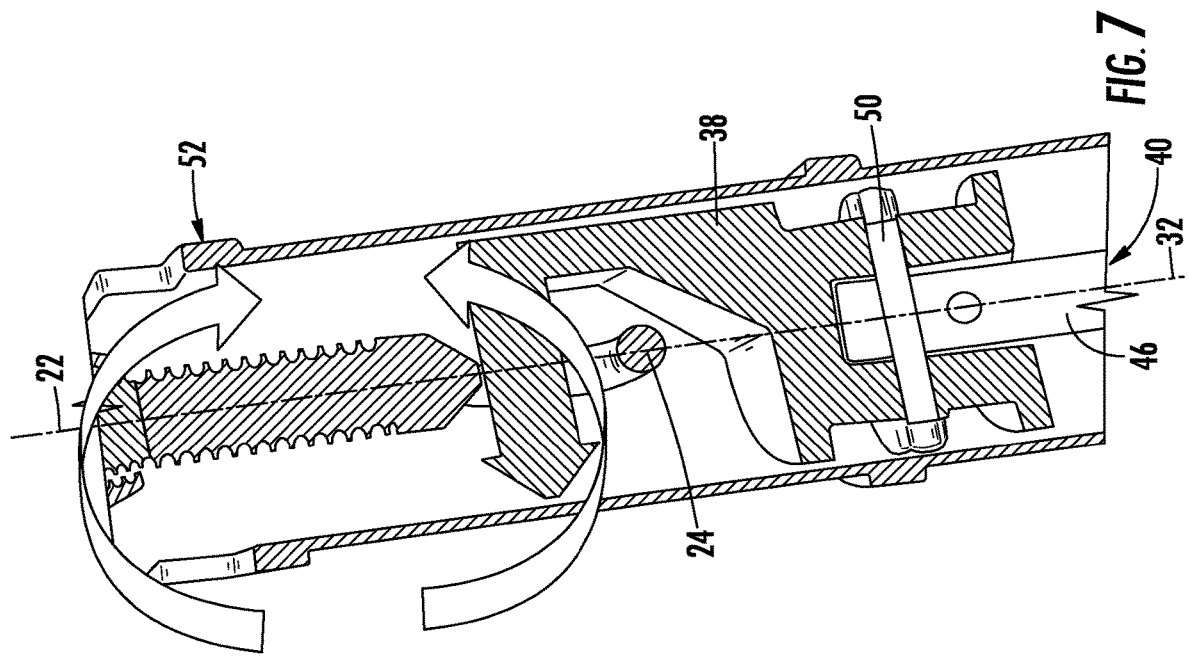
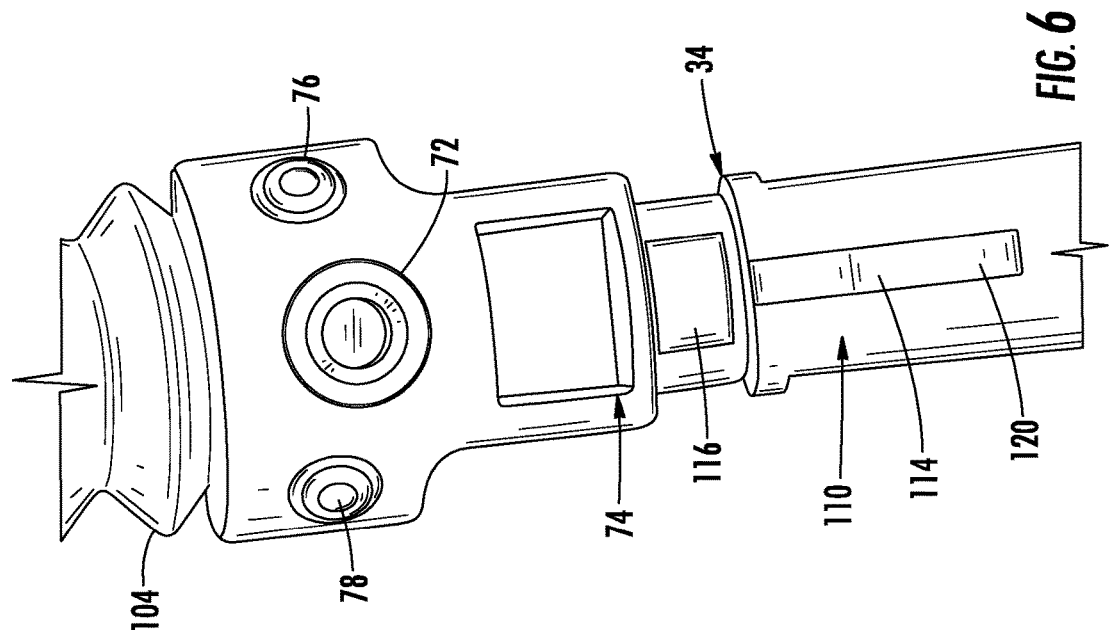

US 11,031,755 B2

AUTOMATED SHOTGUN STICK FOR CLAMPING GROUNDING DEVICES ON OVERHEAD LINES

CROSSREFERENCE TO RELATED APPLICATIONS

This application claims the benefit of U.S. Provisional Application No. 62/564,728, filed Sep. 28, 2017, which is hereby incorporated by reference.

TECHNOLOGICAL FIELD

This disclosure is directed toward hot sticks for operating grounding clamps such as are used by electric linemen and other workers to provide a grounded connection to an overhead electrical conductor, such as an overhead electrical power line and the like, wherein the grounding clamp is operated via an elongate stick or pole ("hot stick").

BACKGROUND

Electrical linemen use grounding clamps in their daily work. The linemen use an elongate stick or pole, referred to herein as a "hot stick", to grab an overhead electrical conductor, typically an electric wire, post or ball stud, with the clamp. Once the overhead electrical conductor is engaged, the lineman then tightens the clamp onto the overhead electrical conductor by rotating the stick while holding the clamp on the overhead electrical conductor. This process is time consuming and difficult for the lineman who is operating the stick overhead either from the ground or an elevated bucket. For each operation of a conventional grounding clamp, the number of screw rotations undertaken are at least 15. The lineman operates many such grounding clamps at a stretch in the field and, at end of the exercise, can become very exhausted.

BRIEF DESCRIPTION OF THE DRAWINGS

FIG. 6 is an enlarged view of another portion of the hot stick;

FIG. 7 is an enlarged perspective view of another portion of the hot stick 10;

DETAILED DESCRIPTION

Figure 1:
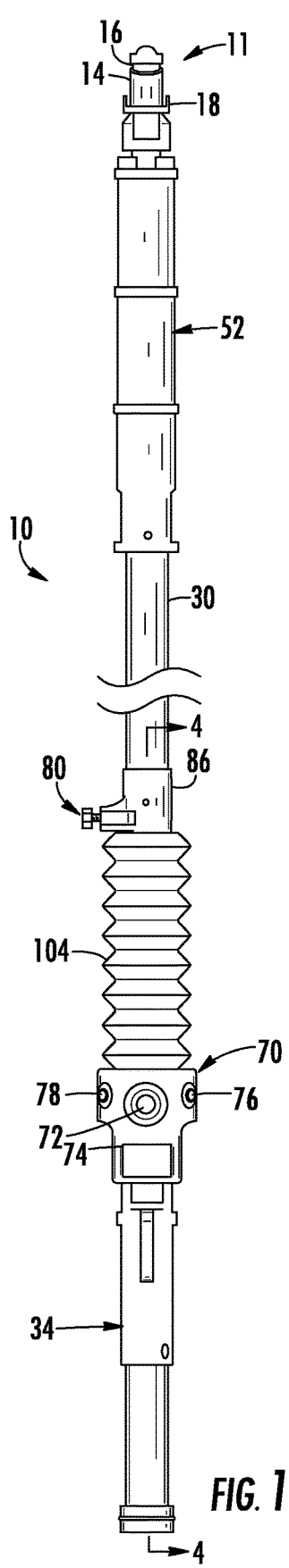
FIG. 1 is a front elevational view of a hot stick in a "loaded" position according to this disclosure, with a portion of the hot stick broken away for purposes of illustration.
Figure 2:
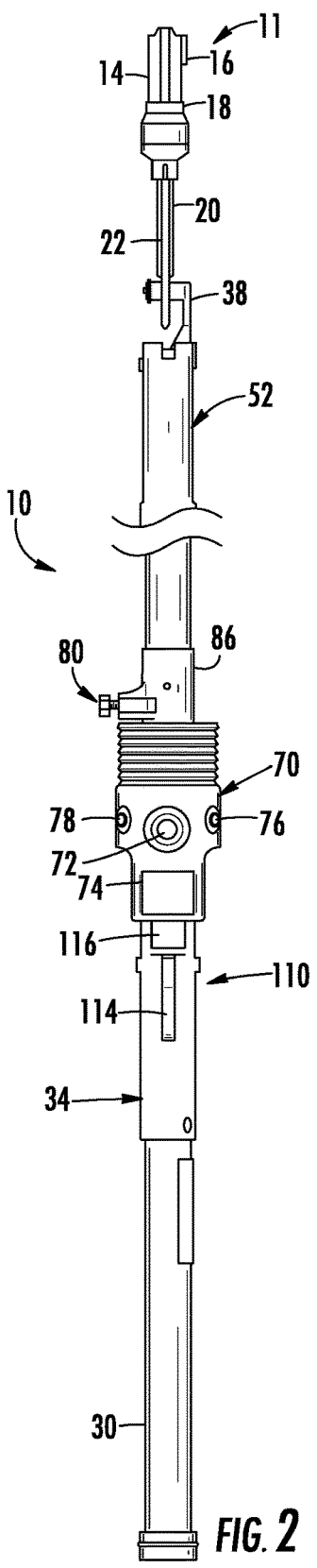
FIG. 2 is a view similar to FIG. 1, but showing the hot stick in a "loading" position.
Figure 3:
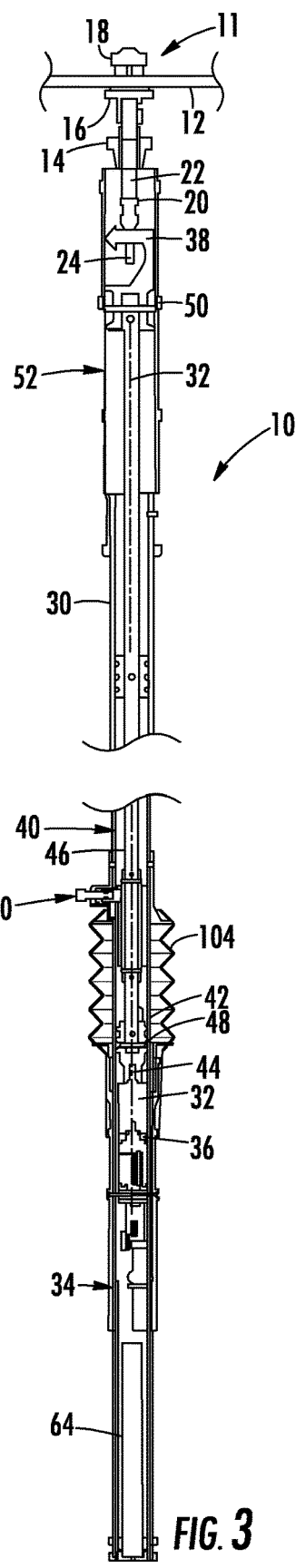
FIG. 3 is a sectional view of FIG. 1.

With reference to FIGS. 1-3, a hot stick 10 is provided for use with commercially available grounding clamps, such as a grounding clamp 11 is shown as an example for use with the hot stick 10 for application to an overhead electrical conductor 12 (shown in FIG. 3), with the grounding clamp 11 being of the type that is conventionally actuated by a user operated "shotgun stick" (not shown). The grounding clamp 11 includes a body 14 that is connectable to the electrical conductor 12 to provide an electrically conductive connection with the grounding clamp 11 in a clamped condition. First and second jaws 16 and 18 extending from the body 14 and are movable relative to each other between an open position wherein the overhead electrical conductor 12 may be inserted into the grounding clamp 11 and a closed position wherein the overhead electrical conductor 12 can be clamped between the jaws 16 and 18 to provide an electrically conductive connection between the grounding clamp 11 and the overhead electrical conductor 12. To accomplish this movement of the jaws, the clamp 11 includes a rotatable member 20 mounted for rotation about an axis 22. The rotatable member 20 includes a torque connector 24 illustrated in the form of a torque ring or eyelet 24, such as is well known in the industry conventionally for engagement with the user operated shotgun stick and transferring a rotational torque applied by the shotgun stick to the rotatable member 20 to thereby actuate the jaws 16 and 18 between the open and closed positions. In this regard, the rotatable member 20 includes external screw threads that are engaged with mating internal screw threads in the body 14 such that the rotatable member 20 translates along the axis 22 in response to the engagement of the screw threads as the rotatable member 20 is rotated about the axis 22.

It should be understood that although the hot stick 10 is shown and described herein in connection with one particular type of commercially available grounding clamp 11 and type of clamp jaws 16, 18, the disclosed hot stick 10 can be utilized with other types of grounding clamps, including C-clamps and duck bill clamps and clamps for ball studs, and grounding clamps having other types of rotatable members for actuating the grounding clamp between open and closed conditions. Accordingly, the hot stick concept disclosed herein is not intended to be limited in any way to any particular type of grounding clamp, unless expressly recited in an appended claim.

The hot stick 10 includes an elongate electrically insulating tube 30 defining a longitudinal axis 32; a bottom housing 34 mounted on the tube 30 to translate relative to the tube 30 along the axis 32 between a "loaded" position shown in FIGS. 1 and 3 and a "loading" position shown in FIG. 2; an electrical motor 36 mounted to the bottom housing 34 for translation therewith; a hook-shaped torque connector 38 configured to engage a torque connector of a grounding clamp, such as the torque connector 24 of the grounding clamp 11; and a drive shaft 40 operably connected to the motor 36 and the torque connector 38 to transfer torque from the motor 36 to the torque connector 38 and to translate relative to the tube along the axis 32 with the motor 36 and the bottom housing 34. While any suitable material can be utilized, in the illustrated embodiment the tube 30 and the drive shaft 40 are formed from fiber reinforced plastic (FRP).

In the illustrated embodiment, the drive shaft 40 includes a torque connector 42 that connects the drive shaft 40 to a motor shaft 44 of the motor 36 so that the drive shaft 40 rotates with the motor shaft 44, the connector 42 being fixed to a rod member 46 of the drive shaft 40 via a drive pin 48. However, it should be appreciated that while this is shown as a two piece construction, it should be understood that any suitable torque connector 42 can be utilized and that the rod member 46 and connector 42 could be a unitary, one piece member. Similarly, the torque connector 38 is joined to an upper end of the drive shaft 40 via a threaded fastener or drive pin 50, but can also be formed as a unitary member of the drive shaft 40. It should also be appreciated that while a particular form of a torque connector 38 has been shown, any suitable form, many of which are known, can be utilized with the hot stick 10 according to this disclosure.

The hot stick 10 further includes an upper housing 52 fixed to the tube 30 and sized so that the torque connector 38 and at least a lower portion of a grounding clamp, such as the grounding clamp 11, can be received and supported within the upper housing 52 with the hot stick 10 in a "loaded" position such as shown in FIGS. 1 and 3, and so that the torque connector 38 can be extended outside of the upper housing 52 for connection with a grounding clamp, such as the grounding clamp 11, with the hot stick 10 in a "loading" position such as shown in FIG. 2. It should be understood that the housing 52 can be customized to each particular type of grounding clamp utilized with the hot stick 10.

In the illustrated embodiment, the motor 36 is a brushless DC motor (BLDC motor) and is carried on a motor mounting plate 54 that is fixed to the bottom housing 34 via fasteners 56 that extend from the bottom housing 34 to the mounting plate 54 through a pair of longitudinal slots 58 formed in the tube 30 extending parallel to the axis 32. The fasteners 56 are guided in the slots 48 for the translation of the bottom housing 34 relative to the tube 30 along the axis 32. A control circuit mounting plate 60 is fixed to the motor mounting plate 54 and carries the control circuitry 62 for the motor 36 and a user interface 70. A power supply in the form of a battery 64 is carried in a lower portion of the tube 30 to power the electrical component of the hot stick 10.

As best seen in FIG. 6, a user interface unit 70 is formed as part of the bottom housing 34 and includes a power switch 72, a user display 74, and a pair of motor control switches 76 and 78. The user display 74 can be provided in the form of a suitable LCD display. The power switch 72 is connected to the battery 64 to control the power to and from the motor 36, the motor control circuitry 62, and the user interface 70. The switch 76 is operably connected to the motor control circuitry 62 so as to drive the motor 36 in a first direction to rotate the shafts 40 and 44 so as to actuate a grounding clamp, such as a grounding clamp 11, to a clamped position wherein a conduit is clamped between the jaws of the clamp. The switch 78 is operably connected to the motor control circuitry 62 so as to drive the motor 36 in a direction opposite the first direction to rotate the shafts 40 and 44 so as to actuate the jaws of a clamp, such as a clamp 11, to an open position.

Figure 8:
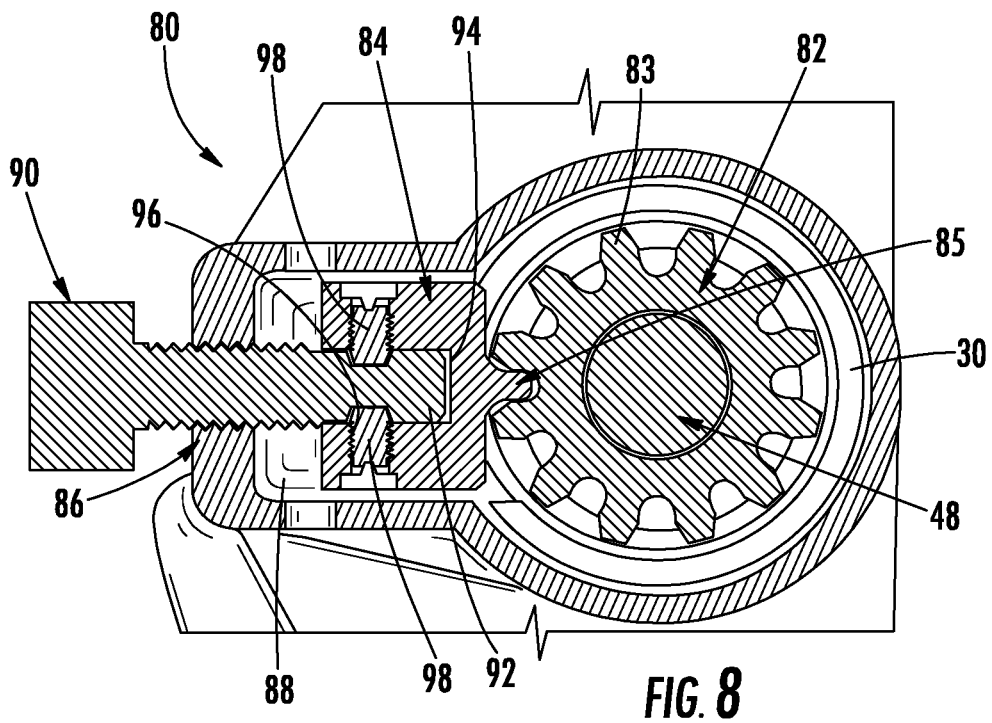
FIG. 8 is an enlarged section view taken from line 8-8 in FIG. 5 and showing a locking mechanism of the hot stick 10 in an engaged position.
Figure 9:
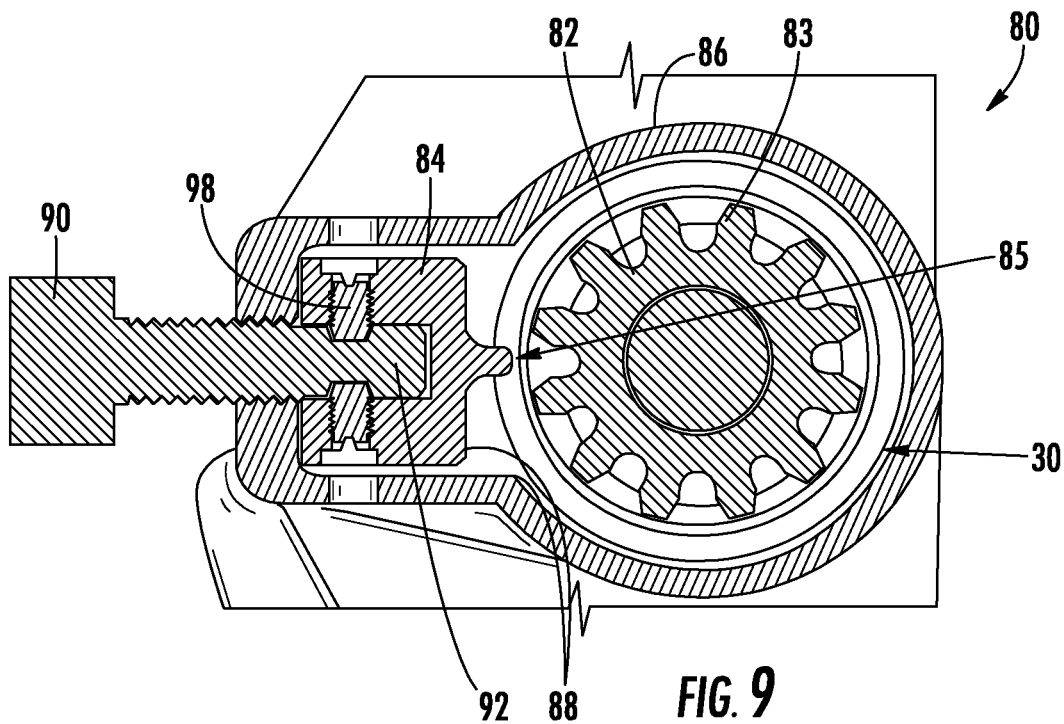
FIG. 9 is a view similar to FIG. 8 showing the locking mechanism in a disengaged position.
Figure 12:
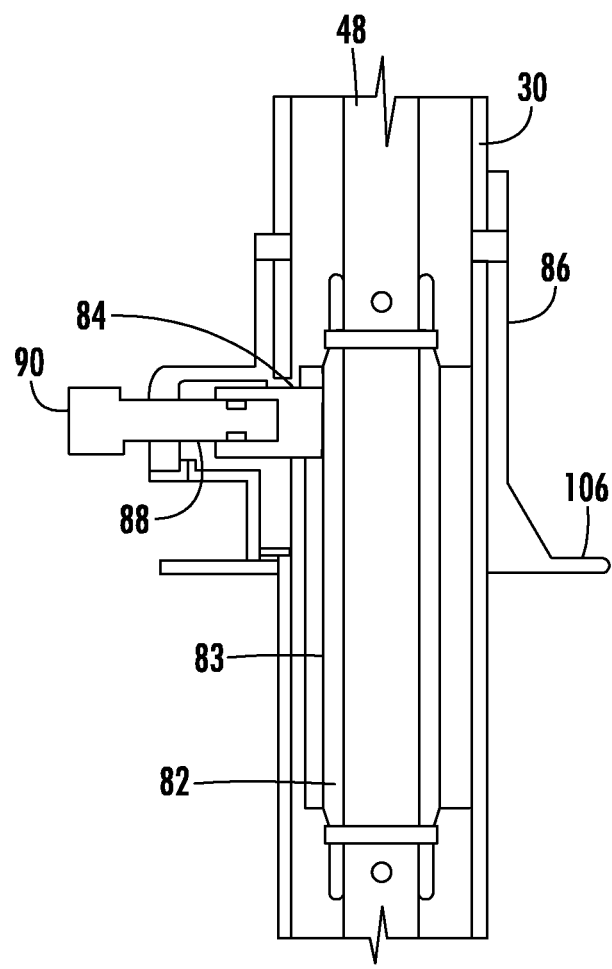
FIG. 12 is a section view showing selected components of the hot stick.
Figure 13:
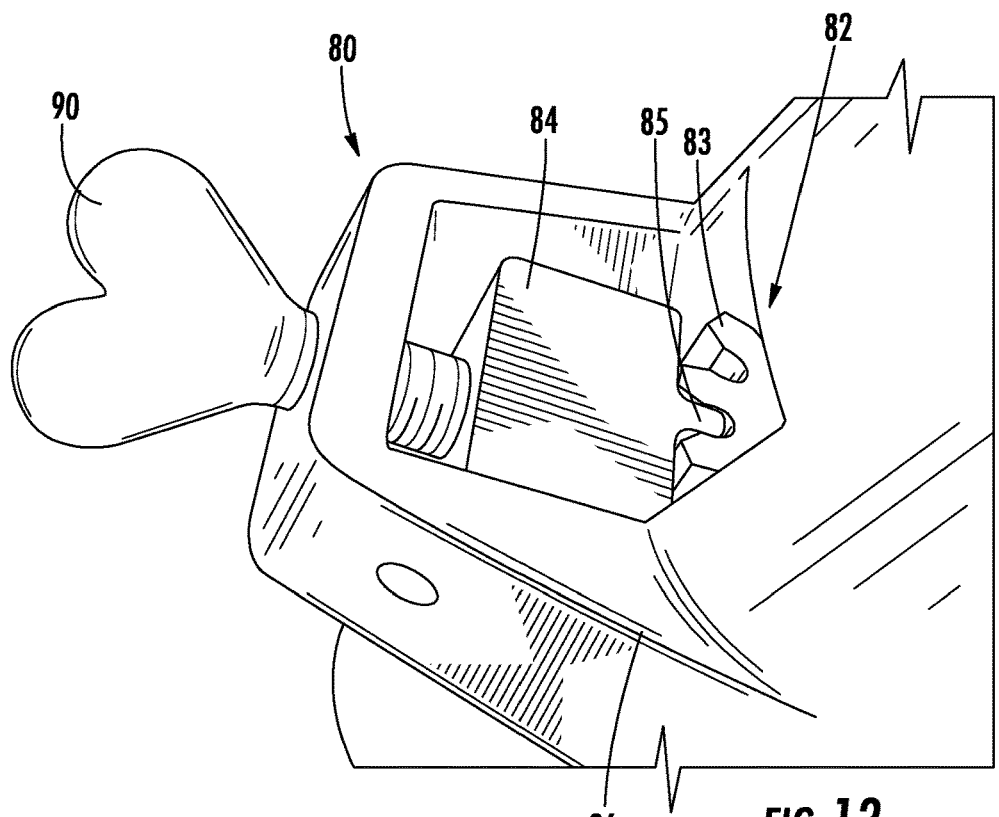
FIG. 13 is a perspective view illustrating another embodiment of the locking mechanism shown in FIGS. 8-12, with the locking mechanism shown in an engaged position.
Figure 14:
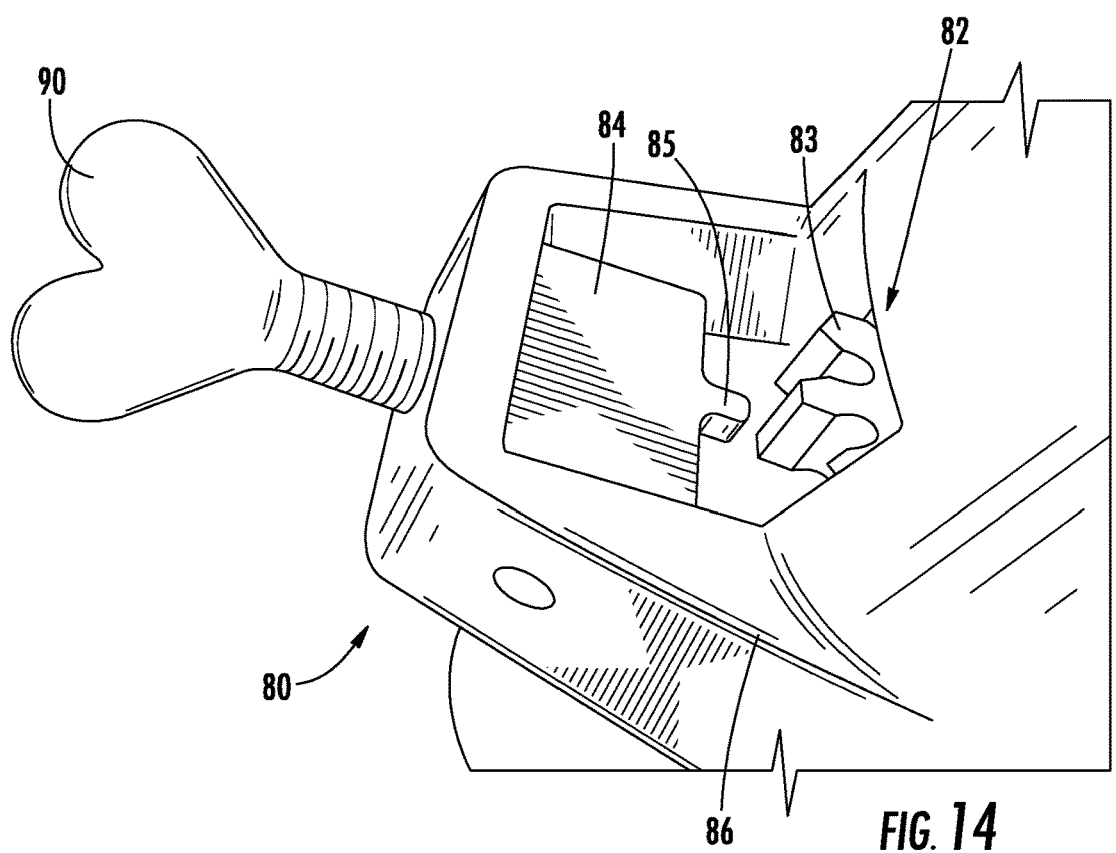
FIG. 14 is a view similar to FIG. 13 but showing the locking mechanism in a disengaged position.
Figure 15:
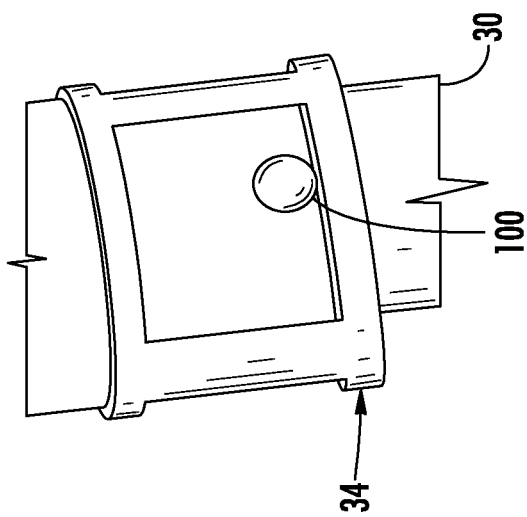
FIGS. 15-18 are perspective views showing selected components of the hot stick, with FIG. 18 having some of the components broken away for purposes of illustration.
Figure 16:
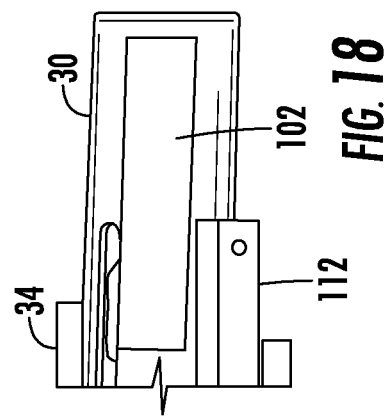
Figure 17:
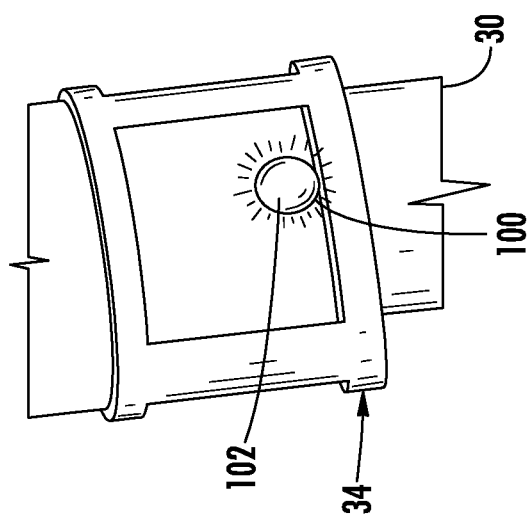
Figure 18:
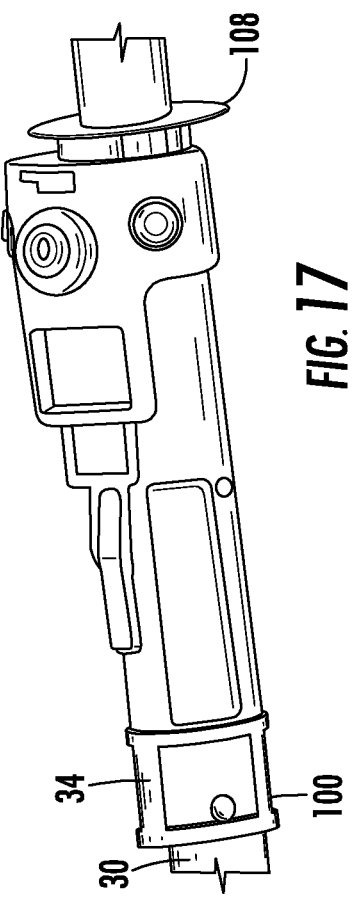

The hot stick 10 further includes a locking mechanism 80 that allows for the drive shaft 40 to be manually locked to the tube 30 so that the shafts 40 and 44 cannot rotate relative to the tube 30, which allows a user to rotate the tube 30 to manually tighten or untighten a grounding clamp attached to the hot stick 10. This is advantageous when the motor 36 malfunctions or when the motor 36 and/or battery 64 have insufficient power to provide adequate torque for clamping or unclamping a grounding clamp. The mechanism 80 includes a gear or spline 82 having a plurality of equally circumferentially spaced, longitudinally extending elongate ridges 83 extending parallel to the axis 32, with the ridges 83 being provided in the illustrated embodiment as gear/spline teeth 83. While the spline teeth 83 will be advantageous in many applications, it should be understood that other forms can be utilized for the ridges 83 according to this disclosure. Furthermore, while a plurality of equally circumferentially spaced ridges 83 will be advantageous in many applications, in some applications it may be desirable for there to be only a single ridge or other suitable feature for engagement with the remainder of the locking mechanism 80. In the illustrated embodiment, the spline 82 is fixed to the rod 46 of the drive shaft 40 for rotation therewith by a pair of interference pins or threaded fasteners, however, it should be understood that other suitable structure may be provided to fix the spline 82 onto the rod 46 for rotation therewith, such as, for example, keys, mating internal and external splines, etc. The mechanism 80 further includes a locking member 84 mounted to the rod 34 to move between a first position wherein a protrusion or tooth 85 of the locking member 84 is engaged between the teeth 83 with the spline 82 to prevent relative rotation between the drive shaft 40 and the tube 34 and a second position wherein the locking member 84 is disengaged from the spline 82 so that the shaft 40 can rotate relative to the tube 34. In this regard, in the illustrated embodiment, the mechanism 80 includes a housing 86 fixed to the tube 30 and the locking member 84 is mounted to translate within the housing 86 between the first and second positions in a slot 88 that extends perpendicular to the axis 32. A manual actuator is provided in the form of a drive screw 90 that has a threaded engagement in the housing 86 and includes an end 92 rotatably received within a bore 94 of the locking member 84. The end 92 has an annular groove 96 formed therein and a pair of set screws 98 extend from the locking member into the groove 96 to allow the screw 90 to rotate relative to the locking member 84 while fixing the locking member 84 to the screw 90 for axial translation therewith. A user can selectively rotate the screw 90 so that the locking member 84 is either in a first (engaged) position shown in FIGS. 8, 12 and 13 or in a second (disengaged) position shown in FIGS. 9 and 14. As best seen in FIGS. 15-18, the bottom housing 34 can include an aperture/window 100 that allows a user to view a colored strip 102 that extends longitudinally on the tube 30 parallel to the axis 32 and allows a user to determine when manual torque can effectively be applied through the mechanism 80.

Figure 10:
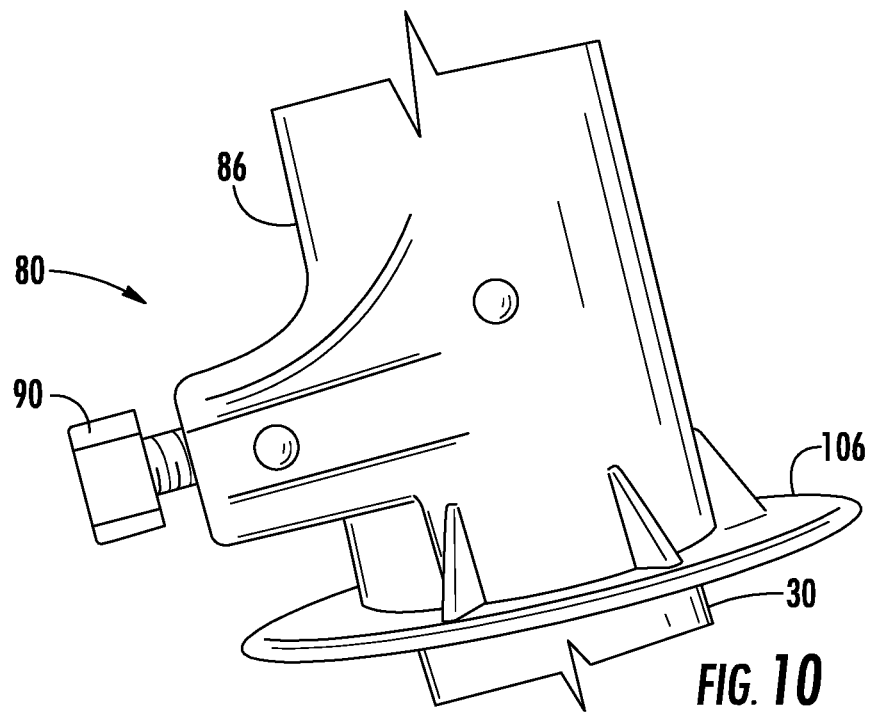
FIG. 10 is a perspective view of the locking mechanism shown in FIGS. 8 and 9.
Figure 11:
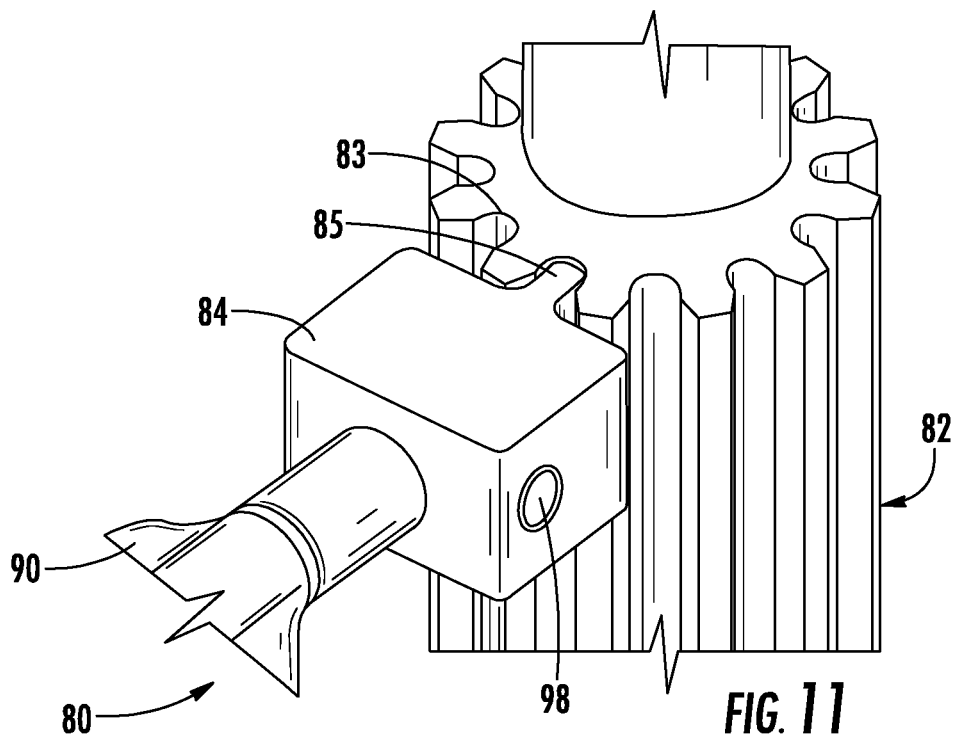
FIG. 11 is a perspective of the locking mechanism shown in FIGS. 8-10 with some of the components shown in phantom for purposes of illustration.

The hot stick 10 further includes a flexible bellows 104 that has an upper end engaged with an annular rib 106 (best seen in FIG. 10) on the housing 86 of the manual tightening mechanism 80 and a lower end that is engaged with an annular rib 108 (best seen in FIG. 18) on an upper end of the bottom housing 34. The bellows 104 serves to restrict or prevent the ingress of water and dust and other environmental contaminants into the interior of the hot stick 10.

Figure 4:
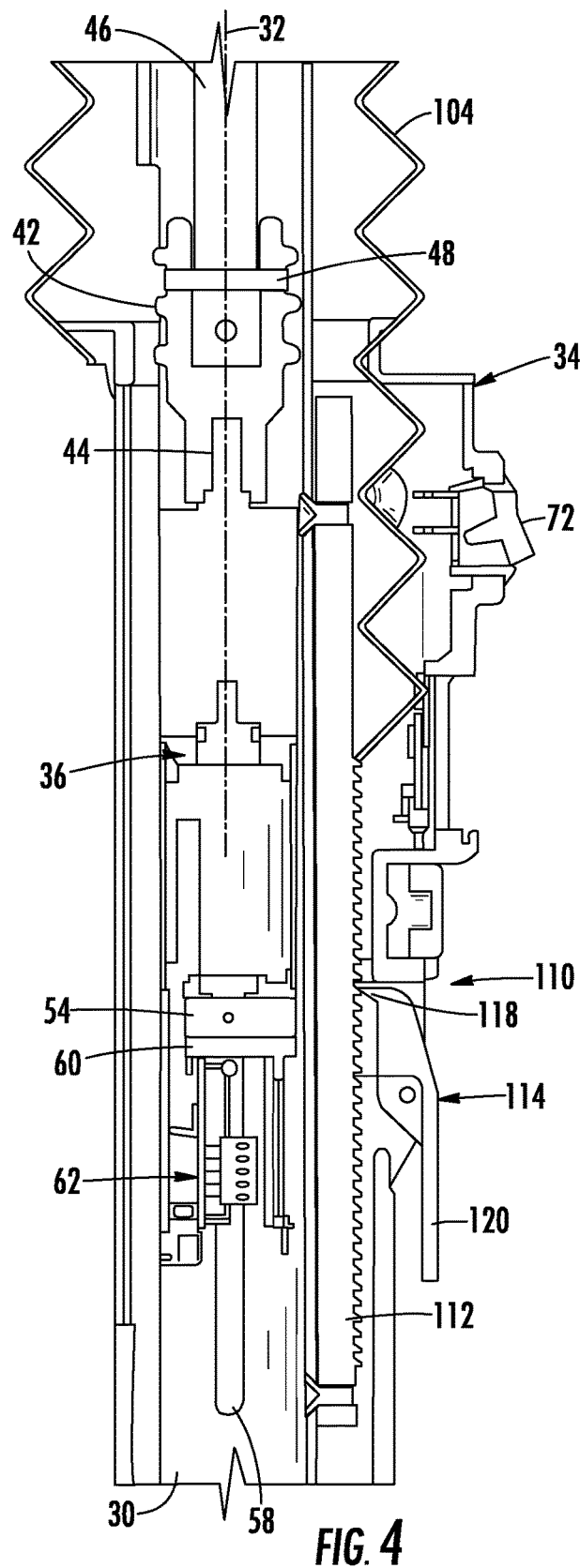
FIG. 4 is an enlarged view taken along line 4-4 in FIG. 1 showing a selected portion of the hot stick.
Figure 5:
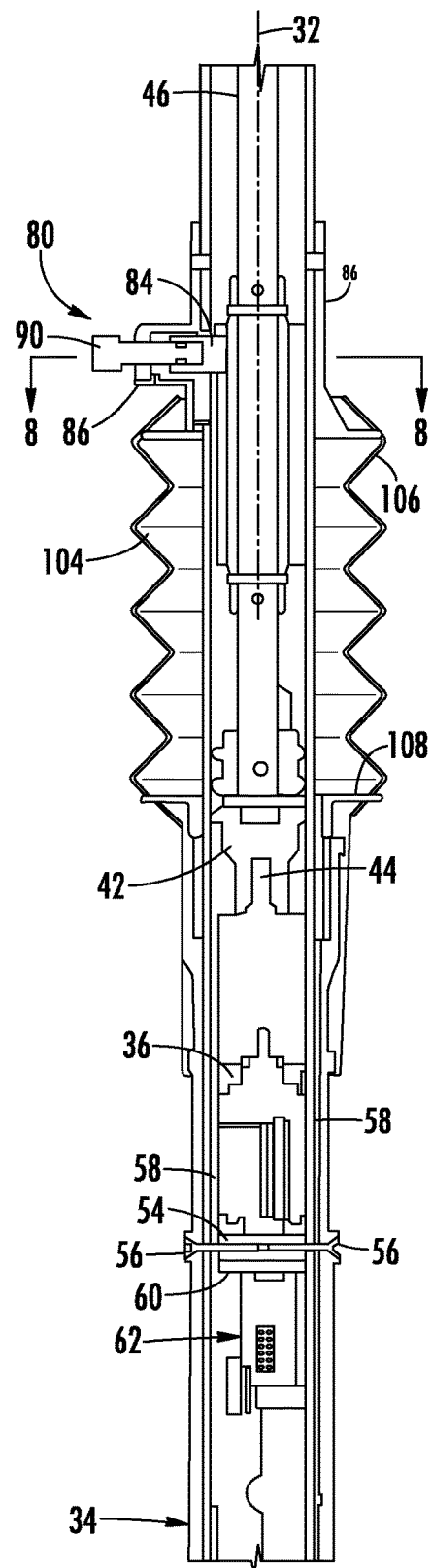
FIG. 5 is an enlarged view of a portion of FIG. 3.

As best seen in FIG. 4, in the illustrated embodiment, the hot stick 10 also includes a ratchet mechanism 110 that includes a toothed rack 112 fixed to the tube 30, a ratchet lever 114 pivotably mounted to the bottom housing 34, and a ratchet button 116 that allows the ratchet mechanism 110 to be placed in a locked condition. The ratchet button 116 is movable by a user from a position wherein it engages the rack 112 to prevent relative motion between the bottom housing 34 and the tube 30 and a free position wherein the bottom housing 34 and the tube 30 may translate relative to each other. The ratchet lever 114 includes a tooth 118 that engages with the rack 112 to allow the bottom housing 34 and the tube 30 to be extended relative to each other while engaging the rack 112 to prevent the bottom housing 34 and the tube 30 from retracting relative to each other unless a lever portion 120 of the ratchet lever 114 is engaged by a user. It should be understood that while a particular ratchet mechanism is shown, any suitable ratchet mechanism may be utilized and the illustrated ratchet mechanism is a known construction that is currently commercially offered.

Figure 19:
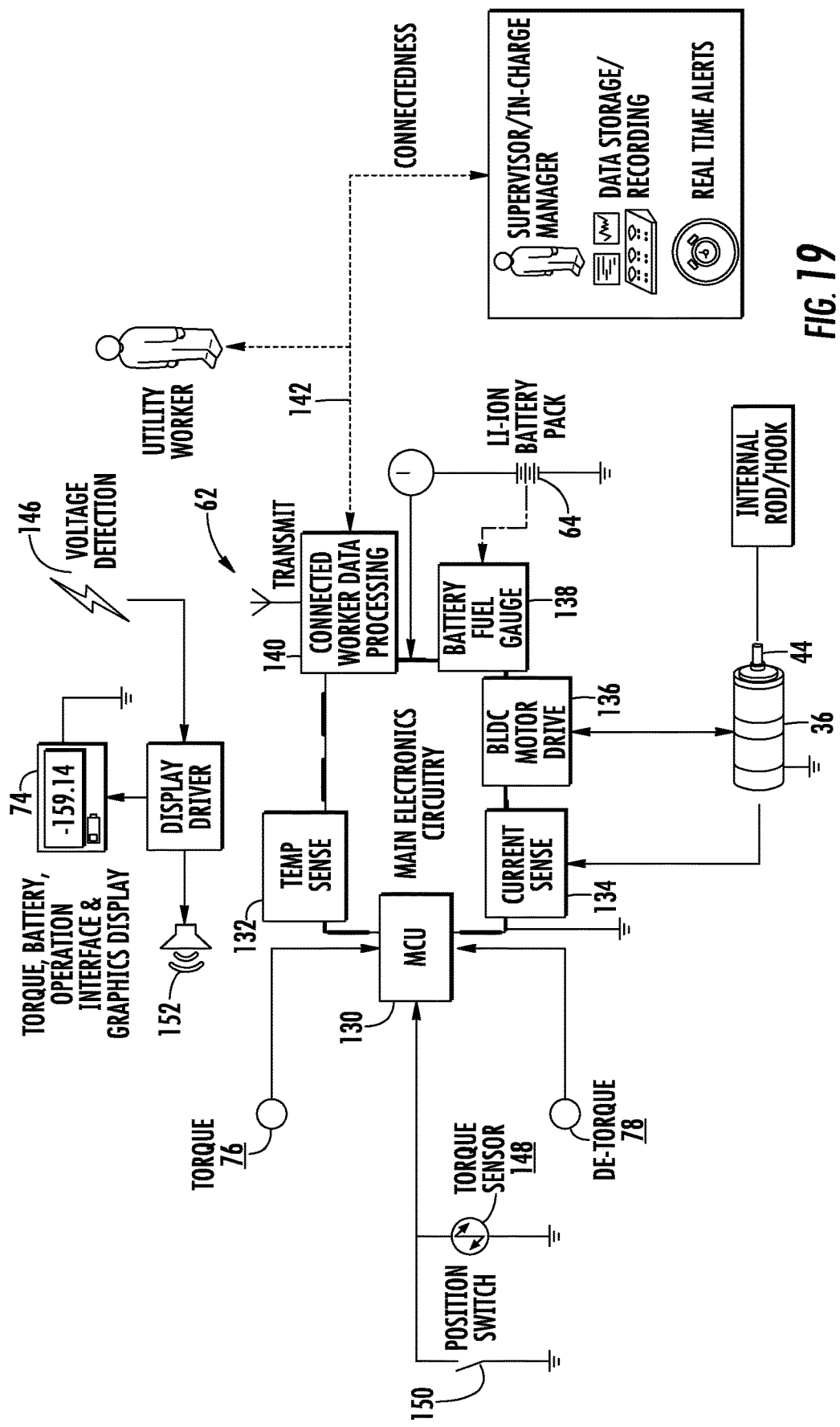
FIG. 19 is a block diagram illustrating the electronics and control circuitry utilized in the hot stick 10 according to this disclosure.
Figure 20:
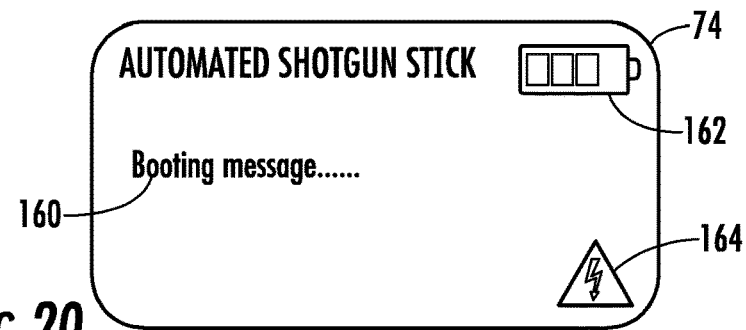
FIGS. 20-24 are views illustrating a user display of the hot stick 10, with each figure showing the user display in a different display state.
Figure 21:
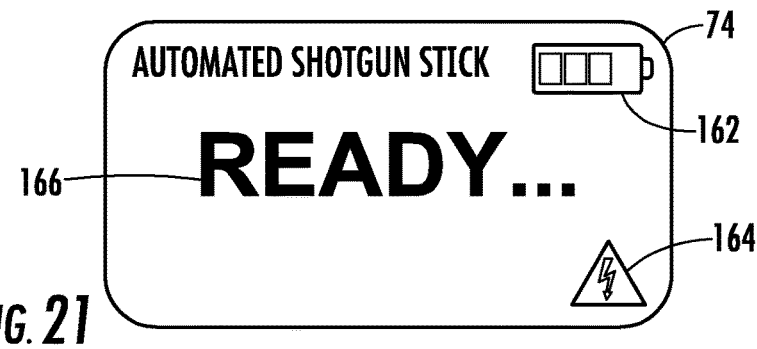
Figure 22:
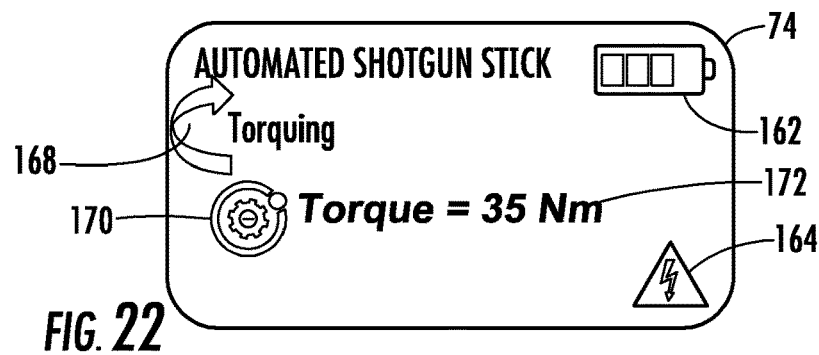
Figure 23:
Figure 24:
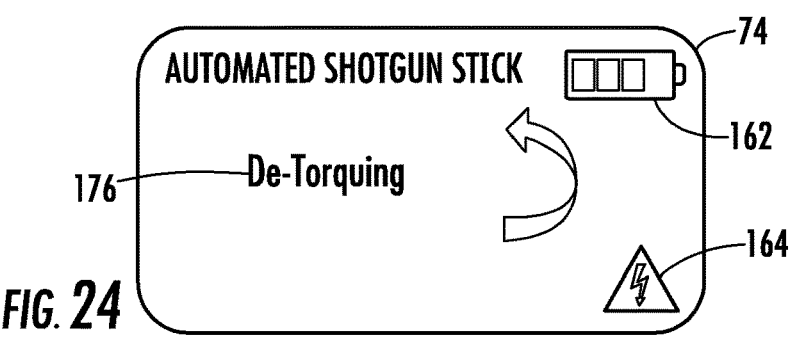

FIG. 19 is a block diagram illustrating the electronics and associated features of the illustrated embodiment of the hot stick 10. As seen, the control circuitry 62 of the illustrated embodiment includes a microcontroller 130, a temperature sensor 132, a current sensor 134, a BLDC motor drive 136, a battery fuel gauge 138, a wireless transceiver 140 for transmitting and receiving wireless data signals 142, and a display driver 144. As also shown, the hot stick 10 of the illustrated embodiment includes a voltage detector 146, a torque sensor 148 to sense the torque being applied to a grounding clamp driven by the hot stick 10, and a position switch 150 operably associated with at least one of the shafts to detect position. In the illustrated embodiment, the user interface also includes a speaker or other audible signal generator 152 that is operably connected to the display driver 144. It should be appreciated that the above-described components of the control circuitry 62 and hot stick 10 can be of any suitable type, several of which are known for each of the components.

The circuitry 62 can be configured to limit the amount of torque applied by the motor 36 to a grounding clamp and to automatically stop the motor 36 when a desired torque is reached. When the switch 76 is pressed, the control circuitry 62 generates PWM (pulse width modulated) pulses to move the motor 36 in a first (clockwise) direction so that the grounding clamp is driven towards a clamped condition. For each press of the torque switch 76, the motor 36 can rotate by a predefined number of degrees. When the motor shaft 44 reaches the maximum movement or torque, the current sensor 134 can indicate to stop further movement. Similarly, when the switch 78 is pressed, the motor 36 will move in an opposite (counterclockwise) direction in order to actuate the grounding clamp to an open condition, with each press of the switch 78 producing a rotation of the motor shaft 44 by a predefined number of degrees. The circuitry 62 can include a suitable memory and can be configured to keep a record of events associated with the hot stick 10, such as the torque applied for each of the grounding clamps actuated by the hot stick 10. The circuitry is configured to provide a wireless signal 142 via the transceiver 140 to a supervisor or other worker who can alert the user to tighten a grounding clamp either less or more in order to achieve a desired condition for the particular grounding clamp. Additionally, the circuitry 62 can initiate wireless signals 142 that allow a supervisor or other worker to understand the usage pattern and compliance associated with each hot stick 10, and to also locate a user and monitor the user's field activity in real time.

Furthermore, the wireless transceiver 140 transmits signals 142 that help a supervisor or other worker to track the location of the stick 10 and the user, and to monitor the service life of the hot stick 10 based on the number of times the hot stick 10 has been used. Furthermore, the transceiver 140 can send a signal 142 to a supervisor or other worker to alert the supervisor or other worker that the battery 64 needs to be charged.

The circuitry 62 is configured so that the display 74 can show a numerical valve for the torque being applied to the clamp, an indication of which operation (tightening/loosening) is being performed, an illustration of voltage detection (if an optional voltage detector is integrated to the top of the stick), an indication of the power remaining in the battery, a visual indication of the torque as it increases or decreases, an indication that the motor has stopped when it has reached a full torque, a "ready" indicator after a self-diagnosis of all features that have been performed in the background, and error messages if there is a problem detected with respect to the level of power in the battery or if other features or functions are not working properly. Furthermore, the display 74 can be configured so as to show a constant torque when full torque is achieved by the motor 36, and to further include an LED blinking/visual indication if there is a need for further manual tightening.

One example of the operation and information provided by the display unit 74 can be seen with reference to FIGS. 21-24. When the power switch 72 is moved to the "on" position, the circuitry 62 performs self-diagnostics to ensure that all the features and functions of the hot stick 10 are operating properly and the display 74 will show a booting message or icon 160, together with a battery level indicator 162 and a voltage detected symbol or icon 164. After the self-diagnosis is successfully completed, the display 74 can provide a "ready" text message 166 to inform a user that the hot stick 10 is now operational. When a user presses the switch 76, the display 74 will show a "torquing" text message 168 together with an icon 170 illustrating the torque build-up and a text message 172 indicating the torque value. When the maximum desired torque is reached, the display 74 will provide a "stop" text message 174 together with an audible signal for the speaker, such as a beeping sound, to inform the user that the grounding clamp is properly engaged. When a user is removing a grounding clamp, the user presses the switch 78, and the display will show a "de-torquing" text message 176.

It should be understood that while certain desirable embodiments have been described and illustrated herein, this disclosure contemplates alternatives to those embodiments.

The invention claimed is:

1. A shotgun stick for use with grounding devices, the shotgun stick comprising:
   a housing, wherein the housing defines a first end and a second end opposite the first end;
   a drive shaft supported within the housing;
   a torque connector coupled with a first end of the drive shaft, wherein the torque connector is configured to receive a grounding clamp assembly attached thereto, wherein the grounding clamp assembly is configured to receive an electrical conductor therein;
   a motor assembly operably connected to a second end of the drive shaft, wherein, in an automatic mode, the motor assembly is configured to drive the drive shaft so as to actuate the grounding clamp assembly received by the torque connector; and a manual locking mechanism, wherein, in a manual mode, the manual locking assembly is configured to lock the drive shaft to at least a portion of the housing so as to preclude rotation of the drive shaft and allow manual actuation of the grounding clamp assembly received by the torque connector.

2. The shotgun stick according to claim 1, wherein the grounding clamp assembly further comprises a first jaw and a second jaw, wherein the first jaw and the second jaw are moveable relative to one another between an open position and a closed position.

3. The shotgun stick according to claim 1, wherein the grounding clamp assembly further comprises a rotatable member configured to mate with the torque connector.

4. The shotgun stick according to claim 1, wherein the housing further defines:
an elongate electrically insulating tube defining a longitudinal axis; and
a bottom housing mounted on the tube, wherein the bottom housing is configured to translate relative the tube along the longitudinal axis.

5. The shotgun stick according to claim 4, wherein the motor assembly is further mounted to the bottom housing so as to translate therewith.

6. The shotgun stick according to claim 4, wherein the housing further comprises an upper housing fixed to the elongate electrically insulating tube such that the torque connector is extendable to a loading position in which the torque connector extends beyond the upper housing so as to receive the grounding clamp attached thereto.

7. The shotgun stick according to claim 6, wherein the upper housing is further configured to support the torque connector and at least a portion of the grounding clamp received by the torque connector within the upper housing in a loaded position.

8. The shotgun stick according to claim 1, further comprising a user interface communicably coupled with the motor assembly, wherein the user interface defines at least a first motor control switch and a second motor control switch.

9. The shotgun stick according to claim 8, wherein the first motor control switch is operably connected to the motor assembly so as to drive the motor and drive shaft connected thereto in a first direction to actuate the grounding clamp to a closed position.

10. The shotgun stick according to claim 8, wherein the second motor control switch is operably connected to the motor assembly so as to drive the motor and drive shaft connected thereto in a second direction opposite the first direction to actuate the grounding clamp to an open position.

11. The shotgun stick according to claim 1, wherein the manual locking mechanism further comprises a gear affixed to the drive shaft such that, in the automatic mode, the gear freely rotates with the drive shaft.

12. The shotgun stick according to claim 11, wherein the gear defines a plurality of equally circumferentially spaced, longitudinally extending elongate ridges extending parallel to its axis of rotation.

13. The shotgun stick according to claim 11, wherein the manual locking mechanism further defines a locking member mounted to the housing configured to move between a first position and a second position.

14. The shotgun stick according to claim 13, wherein the locking member further defines a protrusion configured to, in the first position, engage a corresponding tooth of the gear affixed to the drive shaft to prevent relative rotation between the drive shaft and the housing.

15. The shotgun stick according to claim 14, wherein the locking member is further configured to, in the second position, disengage from the gear affixed to the drive shaft such that the drive shaft may rotate relative to the housing.

16. The shotgun stick according to claim 15, wherein the locking member further defines a bore configured to receive a drive screw therein.

17. The shotgun stick according to claim 16, wherein the manual locking mechanism further comprises a drive screw in threaded engagement with the housing, wherein the drive screw defines an end rotatably received within the bore of the locking member.

18. The shotgun stick according to claim 17, wherein the drive screw further comprises an annular groove formed therein configured to receive a pair of set screws extending from the locking member into the annular groove such that the drive screw may rotate relative to the locking member while fixing the locking member to the screw for axial translation therewith.

19. The shotgun stick according to claim 18, wherein the drive screw is further configured to, via manual actuation, drive the locking member between the first position and second position.

20. The shotgun stick according to claim 1, further comprising a visual indicator configured to illustrate instances in which the shotgun stick is operable in the manual mode.

* * * * *